(12) United States Patent
Shimamura et al.

(10) Patent No.: US 7,378,179 B2
(45) Date of Patent: May 27, 2008

(54) BATTERY ACCOMMODATION CASING, BATTERY MODULE AND ASSEMBLED BATTERY

(75) Inventors: Osamu Shimamura, Yokohama (JP); Hideaki Horie, Yokosuka (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 671 days.

(21) Appl. No.: 10/950,533

(22) Filed: Sep. 28, 2004

(65) Prior Publication Data

US 2005/0069759 A1   Mar. 31, 2005

(30) Foreign Application Priority Data

Sep. 29, 2003  (JP)  ............... P 2003-338522
Jun. 28, 2004  (JP)  ............... P 2004-190356

(51) Int. Cl.
*H01M 2/12* (2006.01)
*B60L 11/18* (2006.01)

(52) U.S. Cl. .................. 429/53; 429/56; 429/61; 429/82; 180/65.3

(58) Field of Classification Search .............. 429/53, 429/56, 61, 82, 86, 87, 88, 89, 148, 162; 180/65.3

See application file for complete search history.

(56) References Cited

U.S. PATENT DOCUMENTS

| | | | | |
|---|---|---|---|---|
| 3,935,030 A | * | 1/1976 | Sperandio | ................ 429/82 |
| 4,168,350 A | * | 9/1979 | Oxenreider et al. | .......... 429/87 |
| 5,663,007 A | * | 9/1997 | Ikoma et al. | ................ 429/53 |
| 6,210,825 B1 | * | 4/2001 | Takada et al. | ............ 429/53 X |
| 6,838,207 B1 | * | 1/2005 | Sugita | ....................... 429/82 |
| 6,964,690 B2 | * | 11/2005 | Goda et al. | ............... 429/53 X |

FOREIGN PATENT DOCUMENTS

JP   2001-345081   12/2001

* cited by examiner

*Primary Examiner*—Stephen J. Kalafut
(74) *Attorney, Agent, or Firm*—McDermott Will & Emery LLP

(57) ABSTRACT

A battery accommodation casing includes a casing member having an approximate flat shape to house a laminate-sheathed cell therein in a sealing manner, a recess having a hollow shape in cross section and formed on a surface of the casing member, and a gas release mechanism located on a wall of the recess and releasing gas to outside, the gas being emitted from the laminate-sheathed cell within the casing member in an abnormal situation. Therefore, even where the casing member itself is somewhat deformed by the gas, the gas release mechanism can release the gas to outside, thus improving reliability in an abnormal situation.

14 Claims, 10 Drawing Sheets

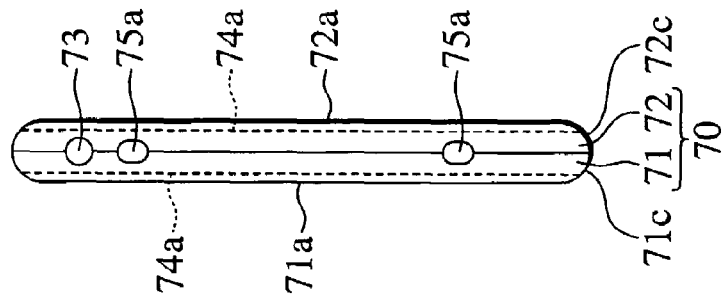
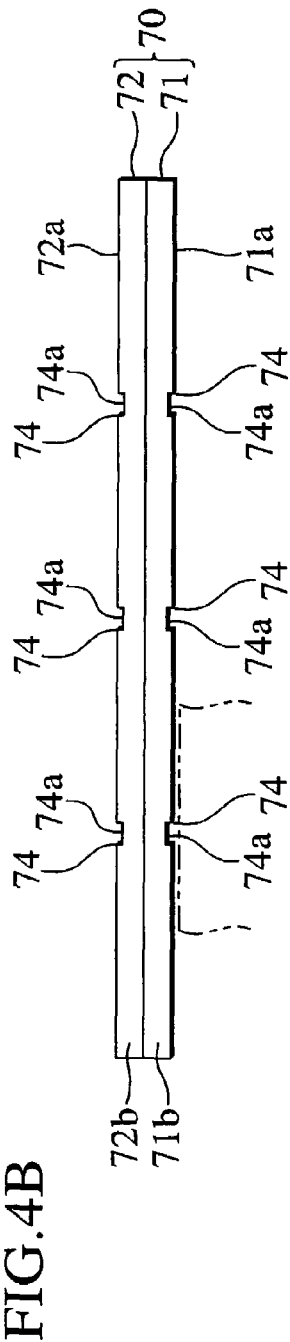
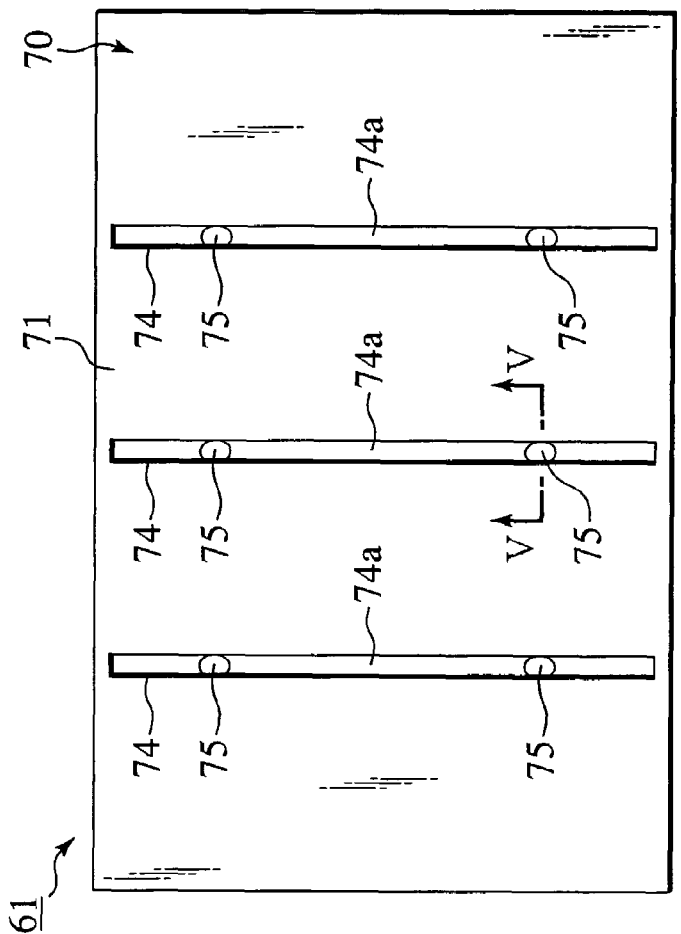
FIG.4C
FIG.4B
FIG.4A

BATTERY ACCOMMODATION CASING, BATTERY MODULE AND ASSEMBLED BATTERY

BACKGROUND OF THE INVENTION

1. Field of the Invention

The present invention relates to a battery accommodation casing for accommodating a laminate-sheathed cell, a battery module, and an assembled battery.

2. Description of the Related Art

In recent years, from a viewpoint of weight saving, a cell sheathed with laminate films or a laminate-sheathed cell has gained attention as a power source of an electric vehicle (EV) powered by electricity or of a hybrid electric vehicle (HEV) in which an engine and a motor are combined.

The laminate-sheathed cell is generally provided with flexible laminate films, and a power generating element is sealed by thermal adhesion of the outer peripheries of the laminate films. Further, the laminate-sheathed cell is provided with electrode leads. One end of each electrode lead is electrically connected to the power generating element and the other end of each electrode lead protrudes the outside of the laminate films (see Japanese Patent Application Laid-Open No. 2001-345081). In Japanese Patent Application Laid-Open No. 2001-345081, a gas release mechanism is also described. When gas generated within the cell reaches a predetermined pressure, this mechanism opens and releases gas to the outside.

Where the laminate-sheathed cell is used as a power source of an EV or a HEV, it is required to prevent corrosion of the laminate film over a long period of time to maintain a long life of the cell. In order to do so, it is considered to contain the laminate-sheathed cell in a battery accommodation casing in a hermetically sealed manner to seal out moisture.

SUMMARY OF THE INVENTION

However, where the laminate-sheathed cell is hermetically sealed in the battery accommodation casing, gas emitted from the laminate-sheathed cell in an abnormal situation fills the inside of the battery accommodation casing. Therefore, a gas release mechanism should be provided also in the battery accommodation casing so as to protect the battery accommodation casing.

Even where the battery accommodation casing itself is somewhat deformed or swollen due to gas emitted from the laminate-sheathed cell at an abnormal situation or expansion of the laminate-sheathed cell before release of gas, the gas release mechanism provided in the casing is required to fully perform the function of releasing gas to the outside.

The present invention was accomplished in order to satisfy the above requirement, and an object the present invention is to provide a battery accommodation casing provided with a gas release mechanism which can fully perform a function of releasing gas to the outside even where the battery accommodation casing itself is somewhat deformed due to gas emitted from the laminate-sheathed cell at an abnormal situation or expansion of the laminate-sheathed cell before release of gas. Another object of the present invention is to provide a battery module having the battery accommodation casing, and an assembled battery.

The first aspect of the present invention provides a battery accommodation casing comprising: a casing member having an approximate flat shape to house a laminate-sheathed cell therein in a sealing manner; a recess having a hollow shape in cross section and formed on a surface of the casing member; and a gas release mechanism located on a wall of the recess and releasing gas to outside, the gas being emitted from the laminate-sheathed cell within the casing member in an abnormal situation.

The second aspect of the present invention provides a battery module comprising: a laminate-sheathed cell in which a power generating element is sealed by a flexible laminate film; and a battery accommodation casing which houses the laminate-sheathed cell therein, the battery accommodation casing comprising: a casing member having an approximate flat shape to house a laminate-sheathed cell therein in a sealing manner; a recess having a hollow shape in cross section and formed on a surface of the casing member; and a gas release mechanism located on a wall of the recess and releasing gas to outside, the gas being emitted from the laminate-sheathed cell within the casing member in an abnormal situation.

BRIEF DESCRIPTION OF THE DRAWINGS

The invention will now be described with reference to the accompanying drawings wherein;

FIG. 4A is a front view showing a battery accommodation casing according to the first embodiment of the present invention;

FIG. 4B is a plan view showing the battery accommodation casing according to the first embodiment of the present invention;

FIG. 4C is a side view showing the battery accommodation casing according to the first embodiment of the present invention;

DETAILED DESCRIPTION OF THE PREFERRED EMBODIMENTS

Hereinafter, description will be made of embodiments of the present invention with reference to the drawings.

Note that, in this specification, "unit cell", "battery module", and "assembled battery" are respectively defined as follows: "unit cell" is referred to as one cell and, in this specification, describes a cell formed by sealing a power generating element with flexible laminate films, so-called a single laminate-sheathed cell; "battery module" describes one constituted by one or a plurality of laminate-sheathed cells electrically connected to each other; and "assembled battery" describes one in which the plurality of battery modules are electrically connected to each other.

First Embodiment

A battery accommodation casing 61 according to a first embodiment of the present invention is detailed with reference to FIGS. 1 to 5.

Figure 1:
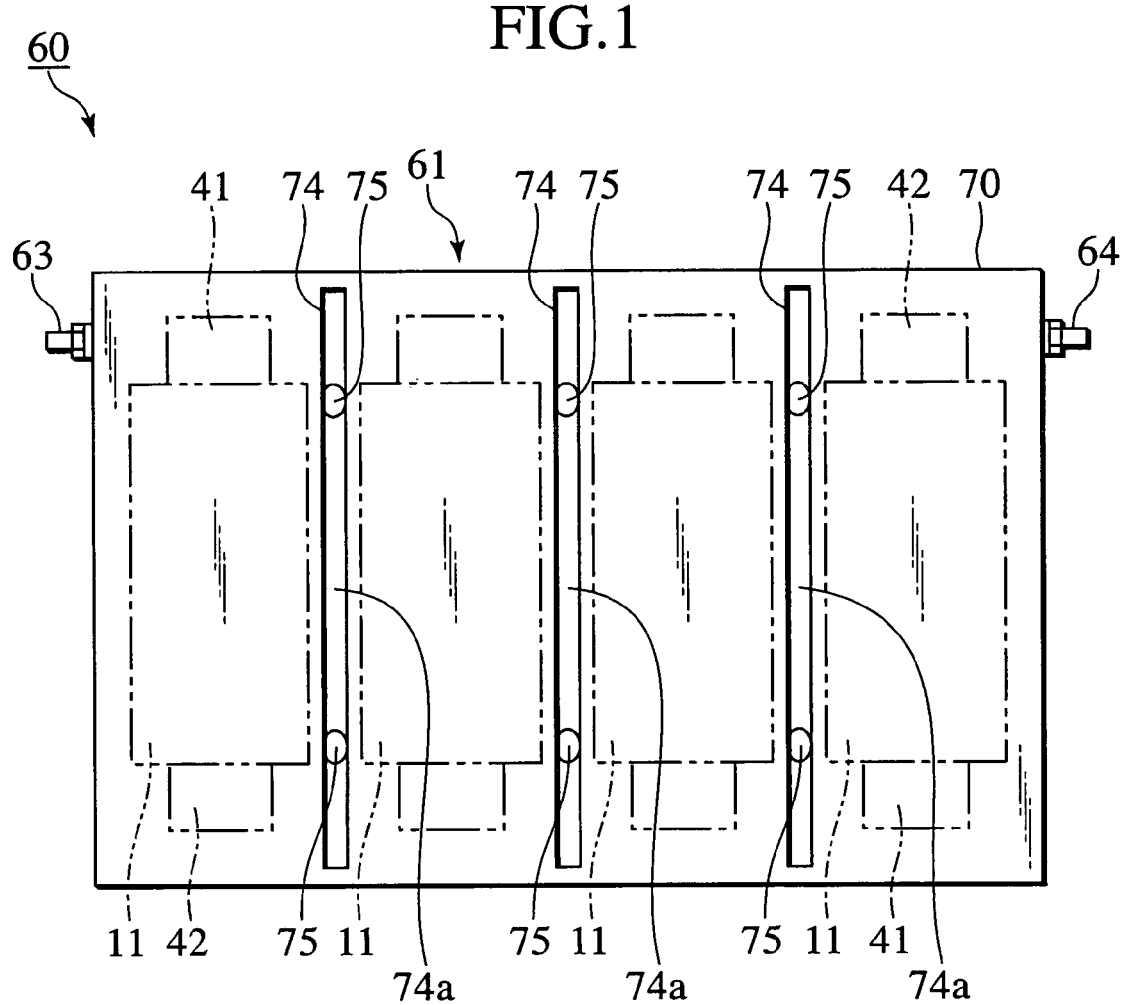
FIG. 1 is a plan view showing a battery module according to a first embodiment of the present invention.

FIG. 1 shows a battery module 60 using the battery accommodation casing 61 of the present invention. The battery module 60 is constructed by housing laminate-sheathed cells 11 in the battery accommodation casing 61. In the battery module, an arbitrary number of laminate-sheathed cells can be connected in series and parallel. Therefore, the battery module 60 capable of satisfying desired current, voltage and capacitance can be obtained easily. The casing 61 is an air-cooling type, and cooling air thus passes around the casing 61 while using the battery module 60. Note that, hereinafter, the battery accommodation casing 61 is also simply called "casing 61".

In the battery module 60 shown in FIG. 1, a cell group is constituted by serially connecting eight laminate-sheathed cells, paired such that cells in each pair are arrayed forwards and backwards (in a direction orthogonal to the sheet surface in FIG. 1) and four of such pairs are arrayed in a direction according to the width of each laminate-sheathed cell 11 (right and left as in FIG. 1). This cell group is housed in the casing 61. Although not illustrated, an appropriate connecting member such as a spacer or a bus bar may be used in connecting the laminate-sheathed cells 11 in series and parallel within the casing 61.

On both sides of the casing 61, a positive electrode terminal 63 and a negative electrode terminal 64 of the battery module 60 are provided. The positive electrode terminal 63 is electrically connected to a positive electrode tab 41 of the laminate-sheathed cell 11 at the head of the cell group, through an unillustrated lead. The negative electrode terminal 64 is electrically connected to a negative electrode tab 42 of the laminate-sheathed cell 11 at the end of the cell group, through an unillustrated lead.

The upper and lower spaces within the casing 61 are filled with an insulating potting material, for example, a low-temperature thermosetting potting material of urethane. The potting material fills the spaces to seal, insulate and fix a connecting circuit. Thus, vibration of each laminate-sheathed cell 11 itself is suppressed, preventing breakage of the electrode tabs 41 and 42 and disconnection of a circuit for electric connection such as a spacer or bus bar.

Figure 2:
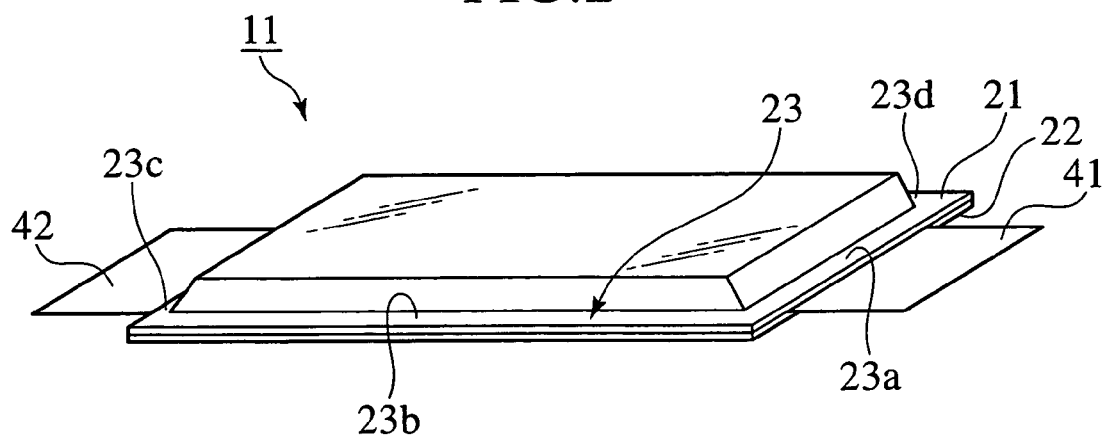
FIG. 2 is a perspective view showing an example of a laminate-sheathed cell.
Figure 3A:
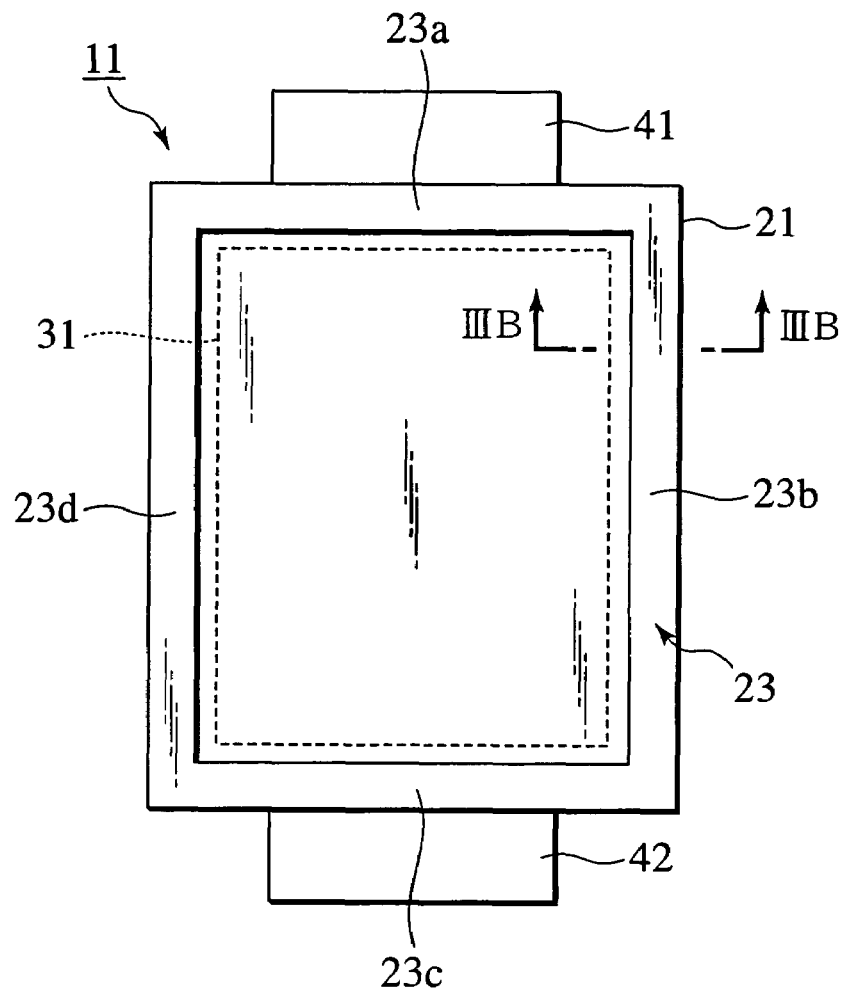
FIG. 3A is a plan view showing the laminate-sheathed cell.
Figure 3B:
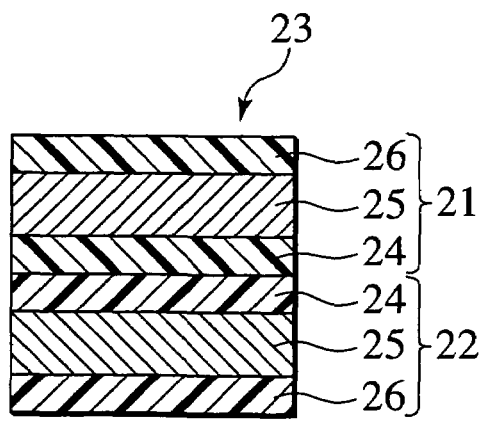
FIG. 3B is a cross-sectional view taken along the line IIIB-IIIB in FIG. 3A.

FIG. 2 and FIGS. 3A and 3B show the laminate-sheathed cell 11 provided in the battery accommodation casing. The laminate-sheathed cell 11 has a pair of flexible laminate films 21 and 22, a power generating element 31 sealed by thermally adhering outer peripheries 23 of the laminate films 21 and 22, and the positive and negative electrode tabs 41 and 42 electrically connected to the power generating element 31. Ends of the electrode tabs 41 and 42 are connected to the opposing end surfaces of the power generating element 31, respectively. The other ends of the electrode tabs 41 and 42 protrude outside from the outer peripheries 23 of the laminate films 21 and 22.

The illustrated laminate-sheathed cell 11 may be a lithium ion secondary cell. In this case, the laminated power generating element 31, in which a positive electrode plate, a negative electrode plate and a separator are sequentially laminated, is sealed by the laminate films 21 and 22. In the laminate-sheathed cell 11 provided with the laminated power generating element 31, the power generating element 31 should be pressed by applying pressure thereto in order to maintain a uniform distance between the electrode plates to maintain the cell performance. Therefore, the laminate-sheathed cell 11 is housed in the casing 61 so that the power generating element 31 is pressed.

Generally, the laminate films 21 and 22 are composite sheets, each made of two or more layers of sheets. Each laminate film has a sealing layer 24 for thermal adhesion, a metal layer 25 such as an aluminum film, and a resin layer 26 forming the outer sheath, sequentially from the inner side to the surface of each laminate film. The sealing layer 24 is formed of resin with thermal adhesiveness. For the resin with thermal adhesiveness, thermoplastic resin such as polypropylene (PP) and polyethylene (PE) is used.

The laminate films 21 and 22 have an approximate rectangular shape, and cover the power generating element 31 by sandwiching the element therebetween. The pair of laminate films 21 and 22 is joined together by thermal adhesion from the vicinity of the end of the power generating element 31 to the ends of the films. In the portions where the electrode tabs 41 and 42 protrude, aluminum plates forming the electrode tabs 41 and 42 are directly joined to the sealing layers 24 by thermal adhesion. Among four lines 23a, 23b, 23c and 23d of the outer peripheries 23 joined together, two lines 23a and 23c are where the electrode tabs 41 and 42 protrude. Thus, these lines 23a and 23c are positions where vibration is transmitted through the electrode tabs 41 and 42 and very small gaps are easily made. Therefore, tear strength of the line 23a and 23c where the electrode tabs 41 and 42 protrude is higher than that of the other two lines 23b and 23d. The tear strength of the lines 23a and 23c can be set higher than that of the lines 23b and 23d by applying a surface treatment to the electrode tabs 41 and 42, adjusting a material of the sealing layer 24, or changing method and condition of thermal adhesion.

Gas is generated within the cell due to an abnormality such as overcharge. In such a case, once the pressure of gas gets higher than a predetermined pressure, the laminate-sheathed cell 11 starts expanding, and, thermal adhesion of outer peripheries 23 is split at the line 23b or 23d with relatively small tear strength. Accordingly, an incident such as an explosion of the laminate-sheathed cell 11 is prevented, and reliability in the abnormal situation improves.

The predetermined pressure with which thermal adhesion of the outer peripheries 23 is split at the line 23b or 23d may be set as appropriate by changing the width of the outer peripheries 23 and conditions of thermal adhesion. The predetermined pressure may be set at about 1 kgf/cm².

As shown in FIGS. 4A to 4C and FIG. 5, the casing 61 according to the first embodiment is preferably used to house the laminate-sheathed cells 11. Generally speaking, the casing 61 has a casing member 70, recesses 74, and split valves 75 (gas release mechanism). The casing member 70 has an approximate flat shape for housing the laminate-sheathed cells 11 in a sealing manner. The recesses 74 have a hollow shape in cross section and are formed on the surface of the casing member 70. The split valves 75 are located in the walls of the recesses 74, respectively, and release gas emitted from the laminate-sheathed cell 11 within the casing member 70 in an abnormal situation to the outside. Detailed description of them is given below.

As shown in FIGS. 4A to 4C, the casing member 70 is constructed by first and second casing members 71 and 72 which are combined together to form a space where the batteries are housed. The first and second casing members 71 and 72 have a flat rectangular shape (see FIG. 4A), and the upper and lower ends of each casing member are formed into an arc shape (see FIG. 4C). The dimensions of the casing member 70 may be selected as appropriate. The casing member 70 shown in the drawings have dimensions to house eight laminate-sheathed cells 11, paired such that the batteries in each pair are arrayed forwards and backwards and four of such pairs are arrayed in a direction according to the width of each laminate-sheathed cell 11. An appropriate material of the first and second casing members 71 and 72 may be selected from a metal, a resin and the like. However, from a viewpoint of cooling capability and strength, it is preferred to use a metal such as aluminum or stainless steel to form the first and second casing members 71 and 72. The first and second casing members 71 and 72 are fastened to each other with unillustrated fastening screws to seal the space where the batteries are housed, thus sealing out moisture. Water tightness may also be improved by applying a sealing material onto the combined surfaces of the first and second casing members 71 and 72, interposing a sealing member such as a gasket between the combined surfaces of the same, or the like. Circular through holes 73 are formed on both sides of the combined first and second casing members 71 and 72. The positive electrode terminal 63 and the negative electrode terminal 64 of the battery module 60 are located in these through holes 73, respectively (see FIG. 1).

Note that surfaces 71a and 72a of the first and second casing members 71 and 72 are collectively called "casing surfaces 71a and 72a" for the convenience of description. The surface 71a of the first casing member 71 is also called a "front surface 71a" of the casing member 70, and the surface 72a of the second casing member 72 is also called a "back surface 72a" of the casing member 70.

Figure 5:
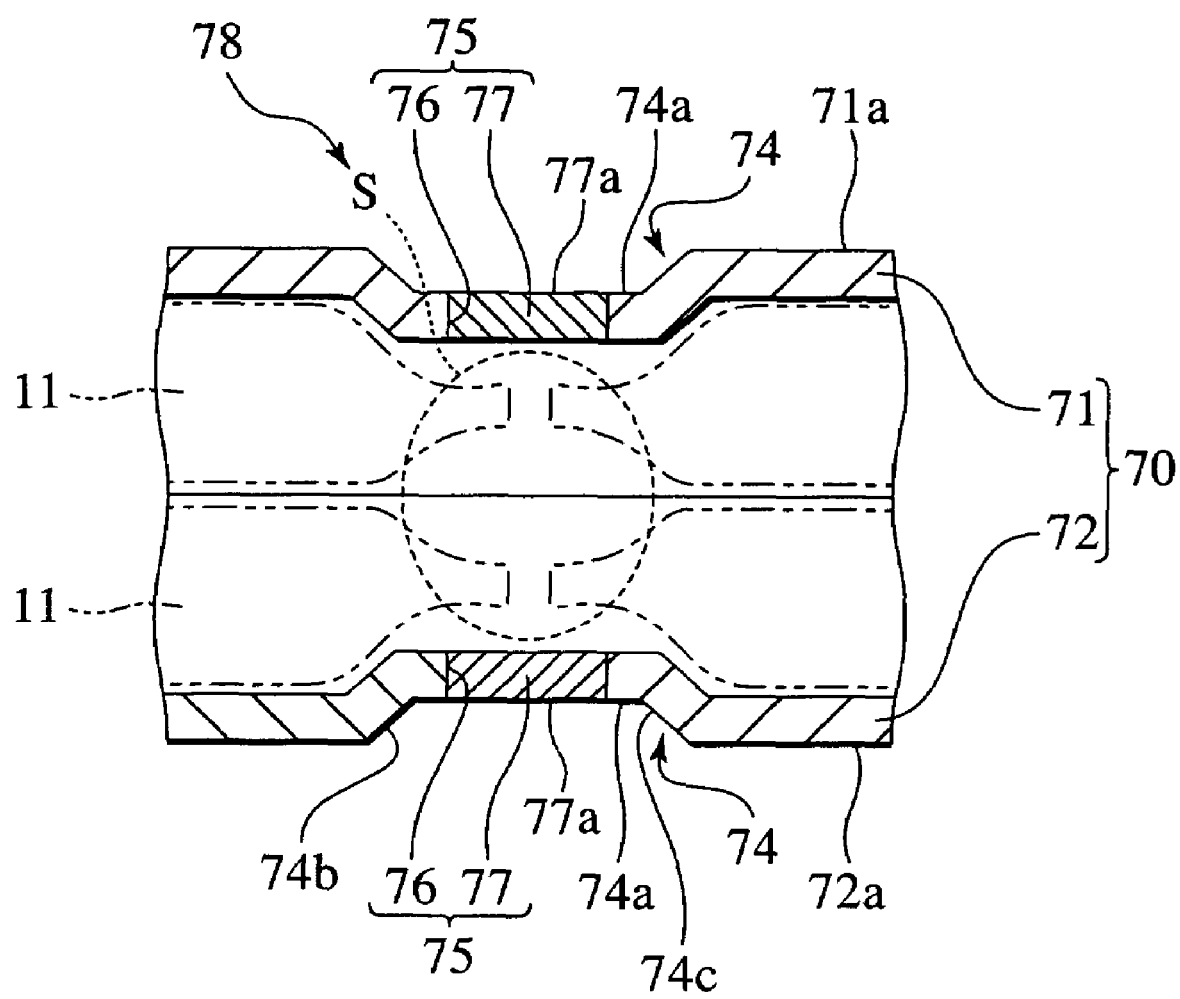
FIG. 5 is a cross-sectional view taken along the line V-V in FIG. 4A.

As shown in FIGS. 4A and 4B, the three lines of recesses 74 are formed, stretching upwards and downwards on the surface of each of the first and second casing members 71 and 72. Each recess 74 is provided at a position between the batteries neighboring in a direction of widths of the batteries. As shown in FIG. 5, the recesses 74 have a hollow shape in cross section and are formed on the surfaces 71a and 72a of the first and second casing members 71 and 72. The recesses 74 are formed by presswork. The dimensions of the width and depth of each recess 74 may be selected as appropriate.

Examples of the dimensions are the width of about 6 to 8 mm and the depth of about 1 to 2 mm. The length of each recess 74 is set at a distance between the ark portions of the upper end and the lower end of each of the first and second casing members 71 and 72. Even where the surfaces 71a and 72a, on which the recesses 74 are formed, are in close contact with other parts, at least one end of each recess 74 communicates with a space around the casing 61 so as to prevent the recesses 74 from being closed. Note that the other part is shown by a chain double-dashed line in FIG. 4B.

The split valves 75 are located in the wall of the recesses 74. In the illustrated example, the split valves 75 are located in the bottom walls 74a of the recesses 74. Two split valves 75 are located in each line of recess 74. As shown in FIG. 5, each split valve 75 has a gas release hole 76 provided in the bottom wall 74a of the recess 74, and a sealing plate 77 sealing the gas release hole 76 and opening the gas release hole 76 once the inner pressure of the casing member 70 reaches a predetermined pressure. The gas release hole 76 has a long hole shape. The sealing plate 77 is formed of an appropriate material such as a sealing material, a metal or a resin, and attached to the bottom wall 74a by joining means such as an adhesive or thermal adhesion so as to seal the gas release hole 76. Once gas emitted from the laminate-sheathed cell 11 within the casing member 70 at an abnormal situation reaches a predetermined pressure, the sealing plate 77 is split or exploded, and gas filling the inside of the casing member 70 is released to the outside from the gas release hole 76. Accordingly, abnormal expansion and explosion of the casing 61 are prevented. The predetermined pressure at which the split valve 75 operates can be set as appropriate by changing material and thickness of the sealing plate 77, a kind of adhesive to be used, a thermal adhesion condition, and the like. The predetermined pressure may be set at the pressure, at which the outer periphery 23 of the laminate-sheathed cell 11 is split, that is, for example, about 1 kgf/cm².

It is preferred that water do not stay on the walls of the recesses 74, where the split valves 75 are located, in order to prevent corrosion of the sealing plates 77 and to maintain normal operation of the split valves 75 and water tightness of the casing 61 over a long period of time. Therefore, a surface 77a of each sealing plate 77 is formed flush with a surface of the bottom wall 74a where the gas release holes 76 are provided. Accordingly, water is prevented from staying around the sealing plates 77.

In the battery accommodation casing 61 of this invention, the split valves 75 are located on the front surface 71a and/or the back surface 72a of the casing member 70. The laminate-sheathed cells 11 are housed in the casing 61, while being pressed in the direction of the thickness of the batteries. Further, the upper space and lower space within the casing 61 are filled with a potting material. If the split valves 75 are provided in the upper surfaces 71b and 72b and/or the bottom surfaces 71c and 72c of the casing member 70, pressure of gas emitted in an abnormal situation does not act on the split valves 75 immediately as the potting material filling the spaces obstructs air flow. Due to this, the split valves 75 cannot perform their functions fully and swiftly. Therefore, it is preferred to use a gap space S (see FIG. 5) as a main passage of gas emitted from the laminate-sheathed cell 11 in an abnormal situation. This gas space S is formed between the batteries neighboring in the direction of widths of the batteries. Since the gas space S faces the lines 23b and 23d of the outer periphery 23 of each laminate-sheathed cell 11, the gap space S is a space to which gas emitted from the laminate-sheathed cell 11 is directly led. Hence, it is preferred that the gap space S formed between the batteries neighboring in the direction of widths thereof be used as a gas passage 78 for gas emitted from the laminate-sheathed cell 11 in an abnormal situation. It is thus required to locate the split valves 75 on the front surface 71a and/or the back surface 72a of the casing member 70 in order for the gas passage 78 to communicate directly with each split valve 75.

Moreover, in the battery accommodation casing 61 of this invention, the split valves 75 are located in the walls that form the recesses 74. The illustrated example of the casing member 70 has a flat shape with a relatively small thickness for a purpose of ensuring a contact area between the casing member 70 and each laminate-sheathed cell so as to improve a cooling effect. Thus, the front surface 71a and the back surface 72a are deformed or expanded more than the upper and lower surfaces and right and left side surfaces of the casing member 70, owing to gas emitted from the laminate-sheathed cell 11 in an abnormal situation or an expansion of the laminate-sheathed cell before release of gas. Accordingly, where the split valves 75 are located directly on the flat surfaces of the front surface 71 and/or the back surface 72a, the front surface 71a and/or the back surface 72a are expanded by gas emitted from the laminate-sheathed cell 11 in an abnormal situation, and then the split valves 75 are pressed onto the other parts. Due to this, the split valves 75 cannot fully perform the function of releasing gas to the outside. The "other parts" may be casings of other battery modules staked on the battery module with a gap therebetween. Accordingly, it is required to locate the split valves 75 in the walls that form the recesses 74, respectively, so that, even where the casing member 70 itself is somewhat deformed due to gas emitted from the laminate-sheathed cell 11 in an abnormal situation, gas filling the casing 61 can be released to the outside.

In the illustrated example, split valves 75a having a configuration similar to that of the split valve 75 are provided on the right and left sides of the casing member 70 (see FIG. 4C). As described earlier, deformation of the right and left sides of the casing member 70 is small in comparison with the front surface 71a and/or the back surface 72a. Thus, in reality, the split valves 75a are not pressed by the other parts. The split valves 75a are thus located directly on the flat surfaces of the right and left sides of the casing member 70.

Note that it is also considered to use a pressure-resistant member as the casing member 70 so that the casing member 70 do not deform, withstanding pressure of gas emitted from the laminate-sheathed cell 11 within the casing member 70 in an abnormal situation. However, this cannot be a realistic solution. This is because, in order to use a pressure-resistant casing, alterations should be made in the thickness of the casing member 70, positions and structures of fastening portions of the first and second casing members 71 and 72, and the like. The size of the casing member 70 thus becomes large and the weight of the casing member 70 increases. In this embodiment, the casing member 70 is not a pressure-resistant casing from a viewpoint of achieving downsizing and weight reduction of the battery module 60. Therefore, once gas is emitted from the laminate-sheathed cell 11 in an abnormal situation, a part of the casing member 70, particularly the front surface 71a and the back surface 72a are expanded.

Next, an operation of the split valve 75 is described.

Due to an abnormality such as overcharge, gas may be generated within the laminate-sheathed cell 11. A stress by the gas acts on the outer peripheries 23 that have thermally adhered to each other. Once the gas pressure within the cell reaches a predetermined pressure, the lines 23b and 23d of the outer peripheries 23 are split, and gas is emitted to the outside through the split portions. Gas is emitted from the laminate-sheathed cell 11 in an abnormal situation towards the gas space S. Here, in the laminate-sheathed cell 11, the outer peripheries 23 are thinner than the power generating element 31. Therefore, there is always a clearance around the outer periphery 23 even where the laminate-sheathed cells 11 are housed in the casing 61 while being pressed in the direction of thickness of the cell. Gas generated within the cell in an abnormal situation is released to the outside through the split outer peripheries 23. Thus, an incident such as an explosion of the laminate-sheathed cell 11 is prevented, and reliability in an abnormal situation is improved.

Due to gas emitted from the laminate-sheathed cell 11 in an abnormal situation, a part of the casing member 70, particularly the front surface 71a and the back surface 72a are expanded simultaneously. Once the inner pressure of the casing 61 reaches a predetermined pressure, the sealing plates 77 of the split valves 75a are also split or exploded, and gas filling the inside of the casing member 70 is then released to outside from the gas release holes 76. Accordingly, abnormal expansion or breakage of the casing 61 is prevented.

In the battery module 60 of this invention, gas emitted towards the gas space S passes through the gas passage 78 configured by the gas space S and soon reaches the split valves 75 which directly communicate with the gas passage 78. Accordingly, the split valves 75 can perform their functions fully and swiftly, and breakage of the casing 61 can be surely prevented.

Here, each split valve 75 is located in the bottom wall 74a of each recess 74. Therefore, even where the front surface 71a and/or the back surface 72a of the casing member 70 are expanded, the split valves 75 are not pressed onto the other parts. Accordingly, the split valves 75 fully perform the function of releasing gas to the outside. Since the split valves 75 are located in the bottom walls 74a of the recesses 74, each split valve 75 can be provided with a relatively large opening area, enabling gas to be released swiftly in an abnormal situation.

Moreover, even where the surfaces of the casing member 70, on which the recesses 74 are formed, are in close contact with other parts, at least one end of each recess 74 communicates with a space around the casing 61. Thus, the split valves 75 can perform the function of releasing gas to the outside even better.

Further, the surface 77a of the sealing plate 77 is formed flush with the surface of the bottom wall 74a. Thus, water is prevented from staying on the bottom wall 74a of each recess 74 to prevent corrosion of the sealing plate 77, and whereby a normal operation of the split valve 75 and water tightness of the casing 61 can be maintained over a long period of time.

As described so far, the casing 61 of the first embodiment includes the casing member 70 having an approximate flat shape for housing the laminate-sheathed cells 11 in a sealing manner, the recesses 74 having a hollow shape in cross section and formed on the surfaces 71a and 72a of the casing member 70, and the split valves 75 located in the walls 74a that form the recesses 74, respectively, and serving as the gas release mechanisms which release gas, emitted from the laminate-sheathed cell 11 within the casing member 70 in an abnormal situation, to the outside. Therefore, even where the casing member 70 itself is somewhat deformed by gas emitted from the laminate-sheathed cell 11 in an abnormal situation, the split valves 75 can release gas, emitted within the casing 61, to outside, thus improving reliability in an abnormal situation.

Further, where the battery module 60 is configured by housing laminate-sheathed cells 11 in the casing 61, the battery module 60 with high capacitance and high output can be formed. In configuring the battery module 60, the positions where the split valves 75 are provided can be easily set, thus facilitating design of the casing 61 and the split valves 75.

Note that, in the illustrated embodiment, each split valve 75 is located in the bottom wall 74a of each recess 74. However, the split valve 75 can also be located in one of or both the side walls 74b and 74c (see FIG. 5) which rise from the bottom wall 74a and face each other.

Further, in the foregoing, the embodiment was described where the recess 74 of the first casing member 71 and the recess 74 of the second casing member 72 are formed at positions facing each other (see FIG. 5). In other words, described was the case where the laminate-sheathed cells 11 arrayed forwards and backwards (upwards and downwards in FIG. 5) within the casing 61 are aligned to each other in the direction of the widths of the battery (right and left in FIG. 5). Therefore, in a case of configuration where the laminate-sheathed cell 11 on the front side and the laminate-sheathed cell 11 on the back side are moved in the width direction and housed in the casing 61, the recess 74 of the first casing member 71 and the recess 74 of the second casing member 72 do not face each other as a manner of course. With such a configuration, the split valves 75 located in the walls of the recesses 74 can perform predetermined function.

Moreover, the battery module 60 should not be limited to the one explained in the embodiment, and may be provided with various measurement and control equipment, for example, a connector for voltage measurement for monitoring a voltage of the cell. Further, in order to connect the laminate-sheathed cells 11 to each other, ultrasonic welding, thermal welding, laser welding or electron beam welding may be used. Alternatively, the laminate-sheathed cells 11 can be connected by using rivets, or by means of caulking.

Furthermore, the laminate-sheathed cell 11 described above has a configuration in which the positive and negative electrode tabs 41 and 42 are connected to the opposing ends of the power generating element 31, respectively. However, the present invention can also be applied to a case of housing the laminate-sheathed cell having a configuration where both the positive and negative electrode tabs 41 and 42 are connected to one end of the power generating element 31.

Second Embodiment

Figure 6A:
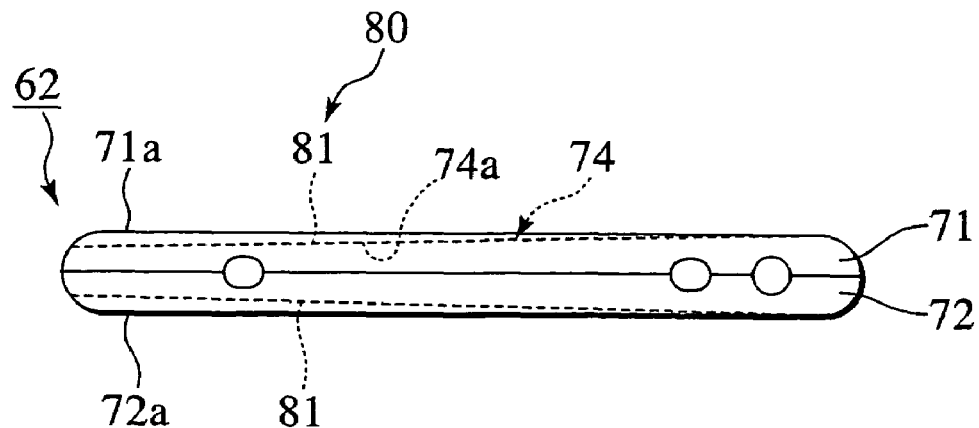
FIGS. 6A to 6C are side views showing a substantial part of a battery accommodation casing according to a second embodiment of the present invention.
Figure 6B:
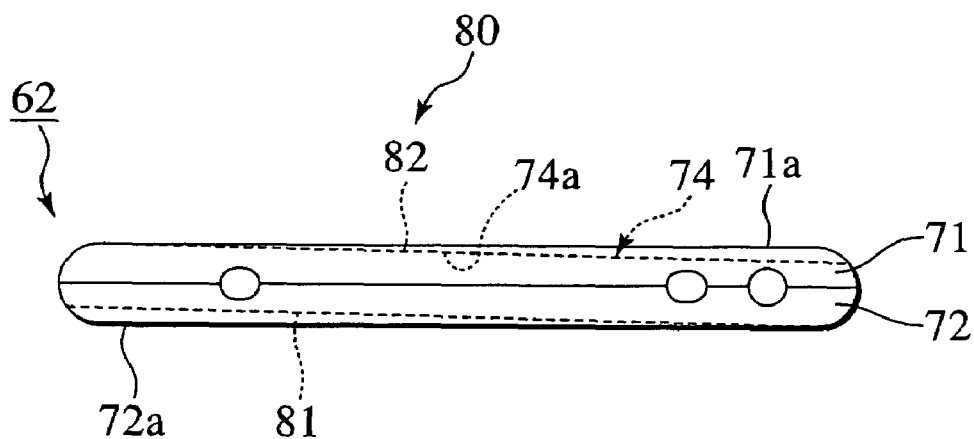
Figure 6C:
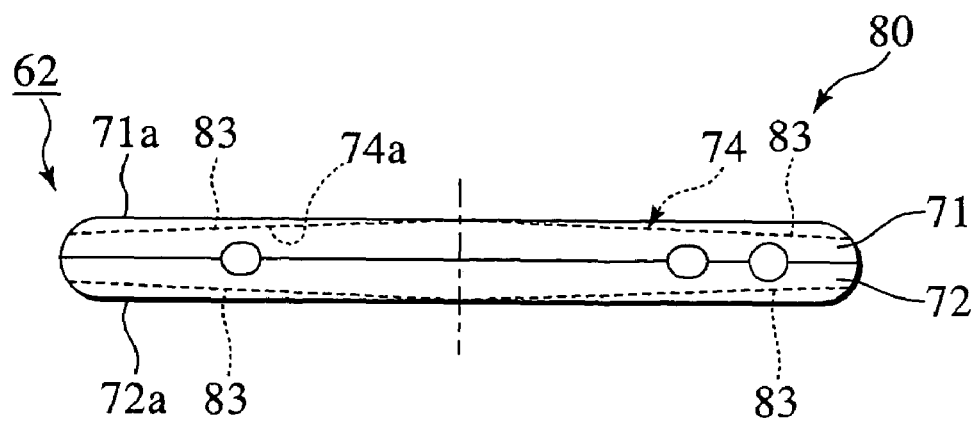

A battery accommodation casing 62 according to a second embodiment of the present invention is detailed with reference to FIGS. 6A to 6C.

In the battery accommodation casing 62 of the second embodiment, a drain mechanism 80 is provided on the wall of each recess 74 where the split vent 75 is located. The drain mechanism 80 prevents water from remaining on the wall. The reason for preventing water residue on the wall is to prevent corrosion of the split valve 75, thus maintaining normal operations of the split valves 75 and water tightness of the casing 62 over a long period of time.

The drain mechanism 80 is configured by forming any of inclined surfaces 81 to 83 on the wall of each recess 74 where the split valves 75 are located. Where the split valves 75 are located in the bottom wall 74a of each recess 74 and the casing 62 is located so that the front surface 71a and the back surface 72a thereof are horizontal, the bottom wall 74a of each recess 74 may be formed as the inclined surface. Specific examples include configurations shown in FIGS. 6A and 6B where each of the inclined surfaces 81 and 82 is formed from one end to the other end of the recess 74 along the longitudinal direction thereof. The examples also includes a configuration shown in FIG. 6C where each inclined surface 83 is formed from an approximate center portion to both ends of the recess 74 along the longitudinal direction thereof. In FIG. 6A, the inclined surface 81 in the first casing member 71 is inclined downwards to the left side of the drawing, and the inclined surface 81 in the second casing member 72 is inclined downwards to the right side of the drawing. In FIG. 6B, the inclined surfaces 81 in both first and second casing members 71 and 72 are in parallel and inclined downwards to the right side of the drawing.

By forming the bottom wall 74a of each recess 74 into any of the inclined surfaces 81 to 83, water run along the inclined surfaces 81 to 83 and drained. Thus, water does not remain on the bottom wall 74a, and corrosion of the split valve 75 is prevented, making it possible to maintain normal operations of the split valves 75 and water tightness of the casing 62 over as long period of time.

As described so far, according to the second embodiment, the wall of each recess 74 where the split valves 75 are located is provided with the drain mechanism 80 which does not allow water to remain on the wall. Therefore, water is prevented from remaining on the wall, and corrosion of the split valve 75 is thus prevented, making is possible to maintain normal operations of the split valves 75 and water tightness of the casing 62 over a long period of time.

The drain mechanism 80 is configured by forming any of the inclined surfaces 81 to 83 on the wall of each recess 74. Thus, the drain mechanism 80 can be formed easily.

Note that the drain mechanism 80 is not limited to the one in the second embodiment configured by forming any of the inclined surfaces 81 to 83 on the wall of each recess 74. The drain mechanism 80 may be configured by, for example, applying a water repellent agent onto the wall of each recess 74. In this case, similarly to the above, water is prevented from remaining on the wall and corrosion of the split valve 75 is thus prevented, making it possible to maintain normal operations of the split valves 75 and water tightness of the casing 62 over a long period of time.

Alternatively, the drain mechanism 80 may be configured by combining any of the inclined surfaces 81 to 83 and application of a water repellent agent.

In the casing 61 explained in the first embodiment, the bottom wall 74a of each recess 74 is flat. Where this casing 61 is located so that the front surface 71a and the back surface 72a are inclined with reference to a horizontal direction, the bottom wall 74a of each recess 74 substantially becomes an inclined surface. The drain mechanism 80 may also be configured by locating the casing 61 in this manner.

Third Embodiment

Figure 7:
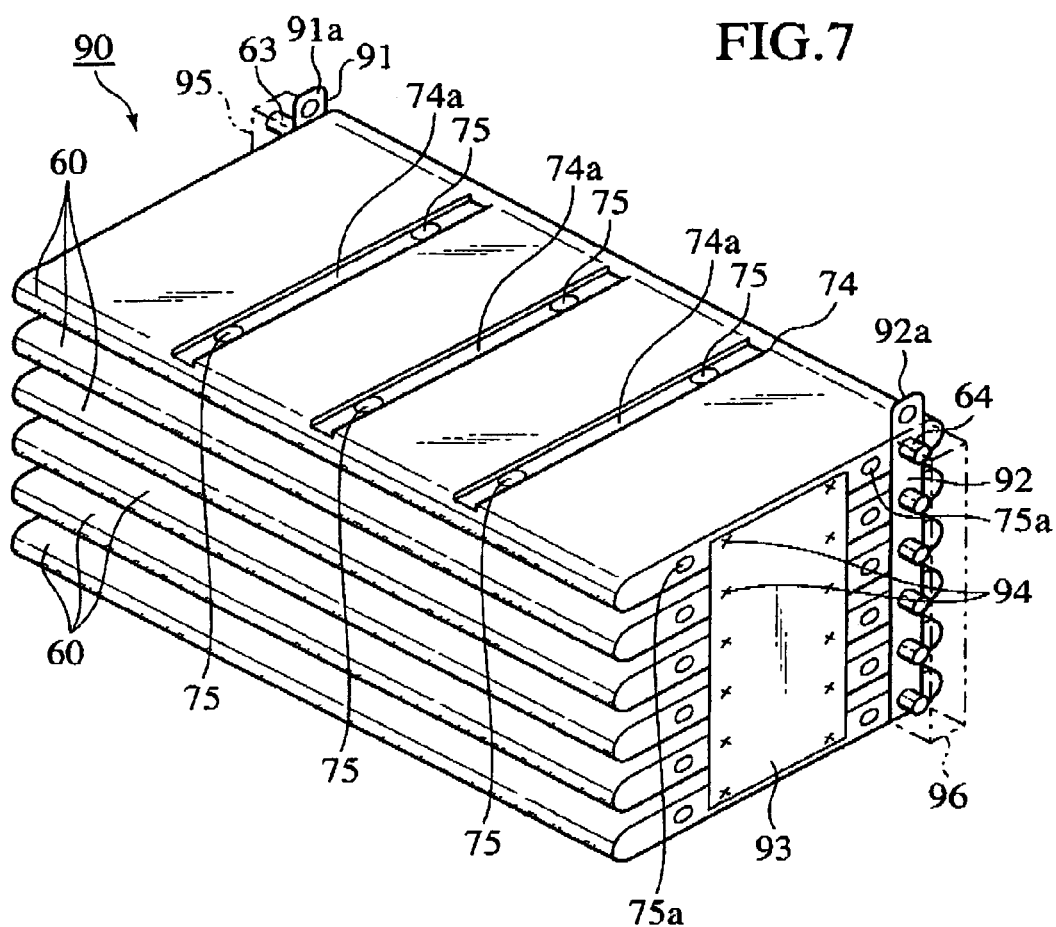
FIG. 7 is a perspective view showing an assembled battery according to a third embodiment of the present invention.
Figure 8:
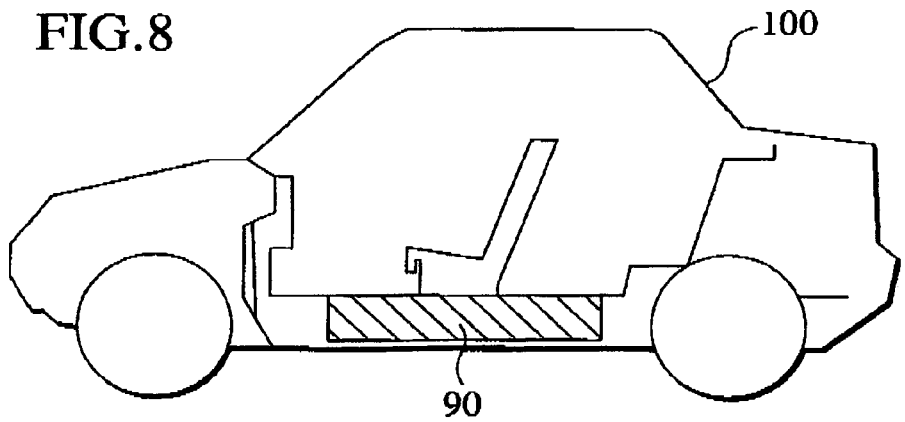
FIG. 8 is a schematic view of a vehicle on which the assembled battery according to the third embodiment is mounted.
Figure 9C:
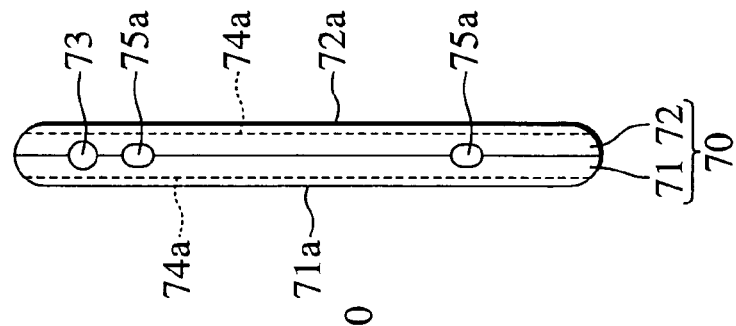
FIG. 9C is a side view showing the battery casing according to the fourth embodiment of the present invention.
Figure 9B:
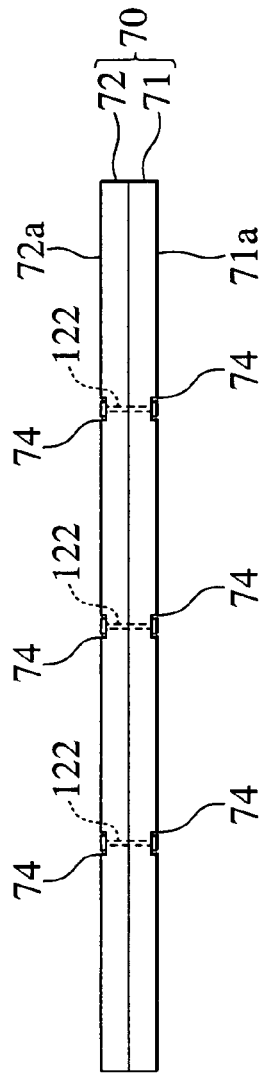
FIG. 9B is a plan view showing the battery casing according to the fourth embodiment of the present invention.
Figure 9A:
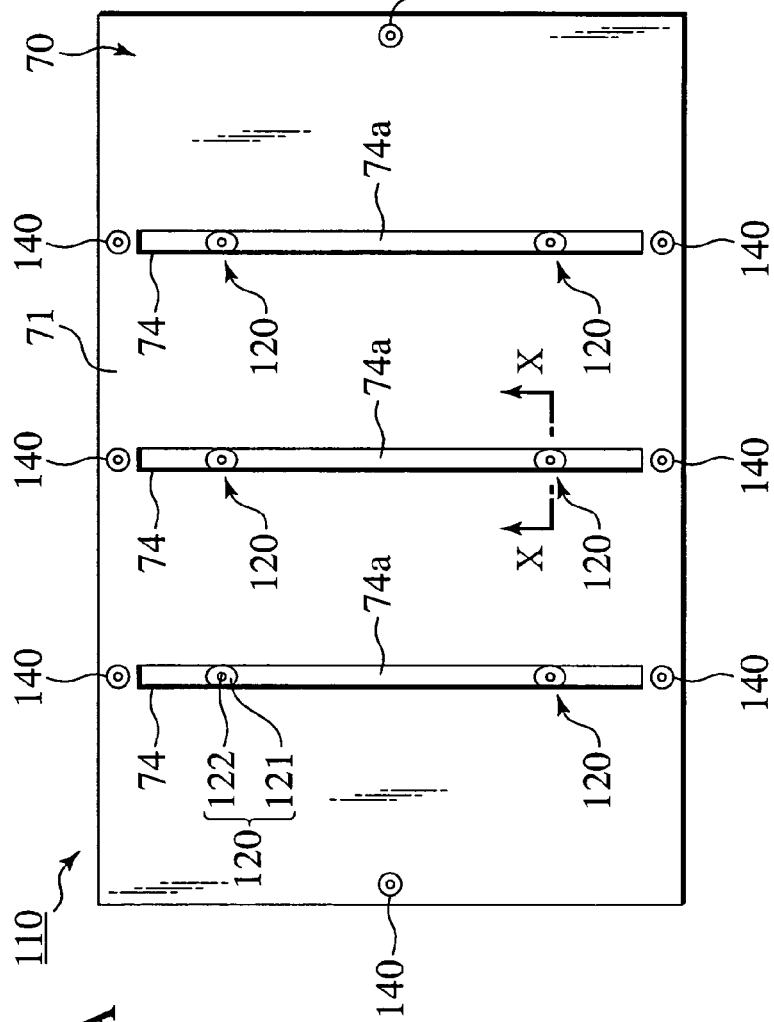
FIG. 9A is a front view showing a battery casing according to a fourth embodiment of the present invention.

Detailed description is provided regarding an assembled battery 90 according to a third embodiment of the present invention and a vehicle 100 on which said assembled battery 90 is mounted, with reference to FIGS. 7 and 8.

The assembled battery 90 of the third embodiment is configured by electrically connecting the plurality of battery modules 60 of the first embodiment in series and/or in parallel. This configuration of the assembled battery 90 makes it possible to satisfy requirements regarding battery capacitance and output for each intended purpose at relatively low cost, without fabricating a new battery module 60 dedicated for each purpose.

As shown in FIG. 7, six battery modules 60 are connected in parallel to form the assembled battery 90. In order to do so, the positive electrode terminals 63 of the respective battery modules 60 are electrically connected to each other by using a positive electrode terminal connecting plate 91 having an external positive electrode terminal 91a, and the negative electrode terminals 64 are electrically connected to each other by using a negative electrode terminal connecting plate 92 having an external negative electrode terminal 92a. In addition, connecting plates 93 having openings that correspond to screw holes (not illustrated) provided on both sides of the respective casings 61 are fixed to the screw holes by using fixing screws 94 so that the battery modules 60 are connected to each other. The positive electrode terminal 63 and the negative electrode terminal 64 of each battery module 60 are protected by positive and negative insulating covers 95 and 96, respectively. The covers 95 and 96 are identified by different colors selected as appropriate, for example, red and blue. There is a gap between the upper battery module 60 and the lower battery module 60 for allowing cooling air to flow therethrough.

According to the above, even where a part of the cells 11 and battery modules 60 fails, the assembled battery 90 configured by connecting the plurality of battery modules 60 in series and in parallel can be repaired by merely changing the portion of failure.

In order to mount the assembled battery 90 on an electric vehicle (EV), the assembled battery 90 is mounted under a seat in the center portion of the body of an electric vehicle 100, as shown in FIG. 8. This is because, by mounting the assembled battery 90 under the seat, the interior space and a trunk room can be wide. Note that the position where the battery is mounted is not limited to the position under the seat and may be a lower portion of the trunk room at the rear. As for a vehicle with no engine like an EV and a FCV (fuel cell vehicle), the assembled battery 90 may be located in the front side of the vehicle, where an engine is usually mounted.

Further, the laminate-sheathed cell 11 is lighter than a cell using a metal exterior can. This contributes to an improvement of mileage of an EV or the like through weight saving of the assembled battery 90 and thus weight saving of the whole vehicle 100.

Furthermore, in this invention, mounted on the vehicle 100 is not limited to the assembled battery 90, and may be the battery module 60, a combination of the assembled battery 90 and the battery module 60, the battery module 60 alone, or one laminate-sheathed cell 11 as a unit cell, depending on an intended purpose. The vehicle 100 on which the laminate-sheathed cell 11, the battery module 60 or the assembled battery 90 of this invention can be mounted is preferably an EV, a PCV, a hybrid electric vehicle (HEV), but not limited thereto.

As described so far, the assembled battery 90 is configured by electrically connecting the plurality of battery modules 60 in parallel and/or in series. Accordingly, the assembled batteries 90 with various capacitances and voltages can be obtained by changing basis, that is, the number of battery modules 60 and connection method.

Moreover, mounting the battery module 60 or the assembled battery 90 on the vehicle 100 does not increase the weight of the vehicle 100 dramatically and do not narrow a usable space in the vehicle 100 dramatically either. Thus, the vehicle 100 with excellent fuel economy and travel performance can be provided.

Four Embodiment

A battery accommodation casing 110 according to a fourth embodiment of the present invention is detailed with reference to FIGS. 9A to 12C.

In the fourth embodiment, each split valve 120 serving as a gas release mechanism is split by using expansion of the laminate-sheathed cell 11 in an abnormal situation. In this point, the fourth embodiment is different from the first to third embodiments in which each split valve 75 is split by using the inner pressure of the casing member 70.

Generally speaking, each split valve 120 of the fourth embodiment has a fragile portion 121 and a fixing portion 122. The fragile portion 121 is provided in the wall of each recess 74 and forms a gas release portion 123 by deformation thereof. The fixing portion 122 is for suppressing deformation of the fragile portion 121 to some extent while transmitting a force produced by expanded deformation of the casing member 70, to the fragile portion 121. Then, the force produced by expanded deformation of the casing member 70 due to expansion of the laminate-sheathed cell 11 in an abnormal situation is transmitted to the fragile portion 121 through the fixing portion 122, and the fragile portion 121 is deformed to form the gas release portion 123.

Strength of the fragile portion 121 should be lower than the strength of the wall itself of each recess 74. The strength of the fragile portion 121 is set to be higher than strength required in maintaining water tightness, and to be equal to or lower than strength with which the fragile portion 121 is split at a mechanical pressure applied to the casing 110 by the abnormally expanded laminate-sheathed cell 11.

Each of the illustrated fragile portion 121 is configured by a boundary surface 126 between a gas release hole 124 provided in the wall of each recess 74 and a sealing plate 125 sealing the gas release hole 124. The gas release portion 123 is formed by deformation of the wall around the gas release hole 124 and/or deformation of the sealing plate 125. Similarly to the first embodiment, the sealing plate 125 is formed of an appropriate material such as a sealing material, a metal or a resin, and attached to the wall by joining means such as an adhesive and thermal adhesion so as to seal the gas release hole 124.

Figure 10A:
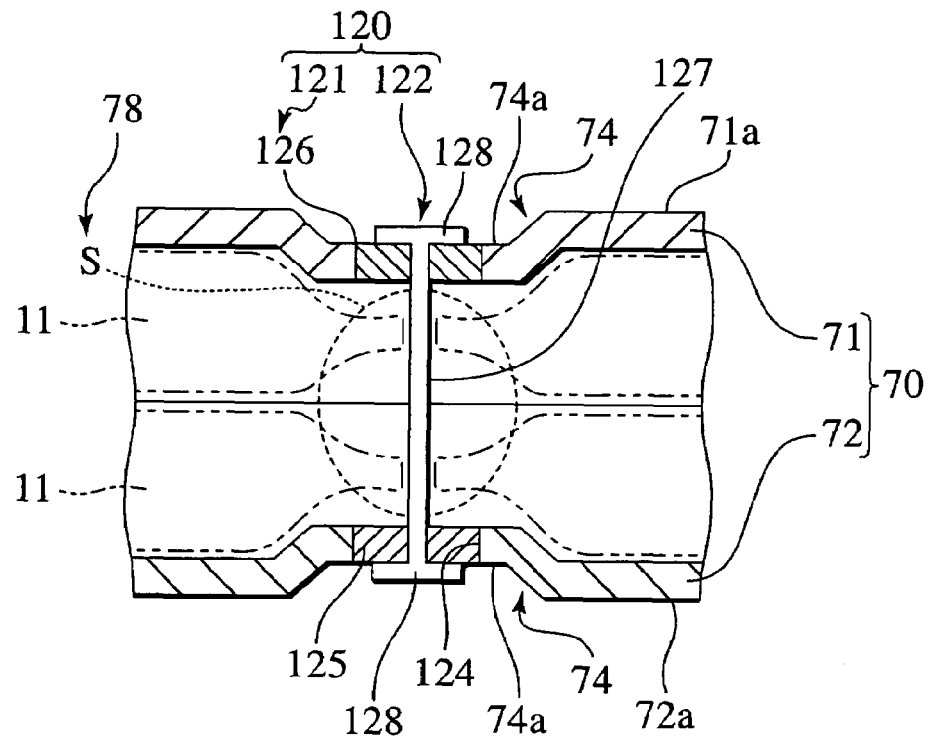
FIG. 10A is a cross-sectional view taken along the line X-X in FIG. 9A.
Figure 10B:
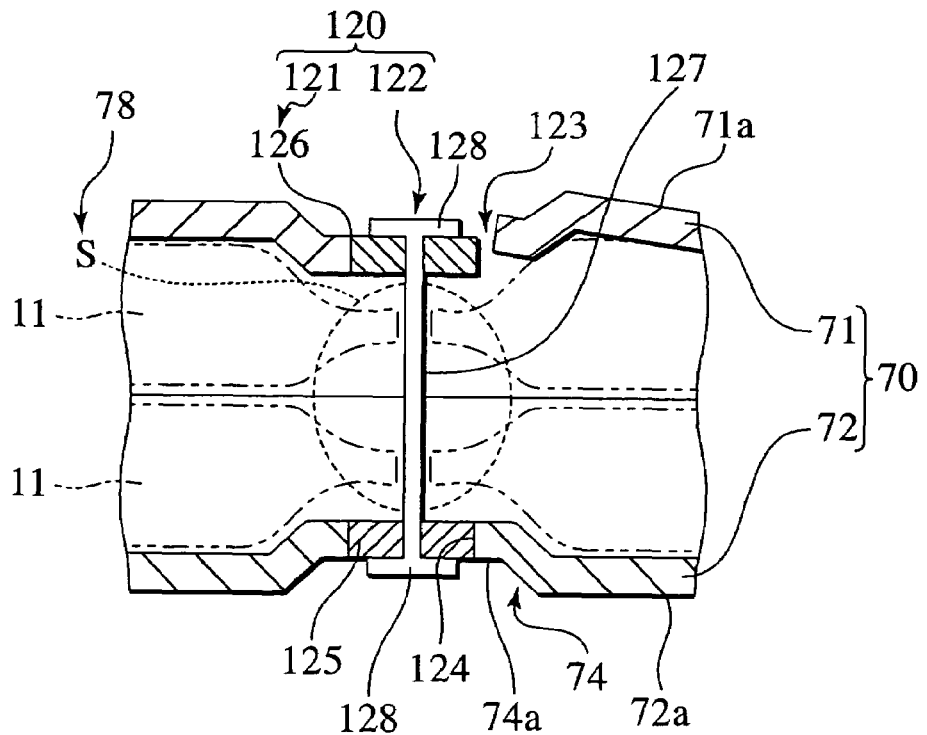
FIG. 10B is a cross-sectional view explaining a gas release mechanism of the battery casing according to the fourth embodiment.

The casing member 70 includes a first surface (the front surface 71a) on the side where the fragile portion 121 is provided, and the second surface (the back surface 72a) located on the opposite side of the first surface through a space where the laminate-sheathed cells 11 are housed. The fixing portion 122 includes a member 127 which fixes the fragile portion 121 provided on the first surface to the second surface of the casing member 70. The member 127 is made of a shaft member, such as a rivet and a bolt, which regulates forward and backward movements (upward and downward movements in FIGS. 10A and 10B) of the sealing plate 125. Locking pieces 128 are provided on both sides of the member 127. With this configuration, the sealing plate 125 on the side of the first casing member 71 is relatively fixed to the second casing member 72 on the opposite side, through the member 127. The sealing plate 125 on the side of the second casing member 72 is thus fixed relatively to the first casing member 71 on the opposite side, through the member 127.

Where the laminate-sheathed cell 11 is expanded in an abnormal situation, a force which makes the casing member 70 expand and deform (a force pushing the cell 11 upwards and downwards in FIGS. 10A and 10B) is produced. In the first embodiment, a stress produced when the casing member 70 expands and deforms is concentrated only at the fastening screws 140 (see FIG. 9A) which fasten the first and second casing members 71 and 72 to each other. On the contrary, in the fourth embodiment, a stress produced when the casing member 70 expands and deforms is concentrated not only at the fastening screws 140 but at the fixing portions 122 including the shaft members 127. This stress is transmitted through the fixing portion 122 to the fragile portions 121, that is, the boundary surface 126 between the gas release hole 124 and the sealing plate 125.

Where the amount of expanded deformation of the casing member 70 is relatively small and a force acting on the fragile portion 121 is relatively small, the fragile portion 121 is resistant to the acting force and does not deform. However, once the amount of expanded deformation of the casing member 70 increases and the force acting on the fragile portion 121 exceeds the strength of the fragile portion 121, the fragile portion 121 is no longer resistant to the acting force and thus deforms. This deformation causes an opening, forming the gas release portion 123. FIG. 10B shows a situation where the wall around the gas release hole 124 is deformed, forming the gas release portion 123 as an opening. Gas emitted from the laminate-sheathed cell 11 within the casing member 70 is released through the gas release portion 123. Occasionally, gas is emitted from the laminate-sheathed cell 11 within the casing member 70 in an abnormal situation before the gas release portion 123 is formed. However, gas filling the casing member 70 is released through the gas release portion 123 to outside. Therefore, abnormal expansion and breakage of the casing 110 are prevented.

The split valve 120 of the fourth embodiment utilizes expansion of the laminate-sheathed cell 11 in an abnormal situation. Therefore, the split valve 120 can be split based on the amount of deformation of casing 110 without being effected by the inner pressure of the casing member 70. Where the split valve 75 is split based on the inner pressure of the casing member 70, there may be some variations in the split condition of the split valve 75, that is, pressure acting on the split valve 75. In comparison to this, where the split valve 120 is split based on the amount of deformation of the casing 110, the amount of deformation of the casing 110 which splits the split valve 120 can be maintained at a uniform level relatively easily. Thus, the split condition of the split valve 120 hardly varies.

As described so far, according to the fourth embodiment, similarly to the first to third embodiments, the split valve 120 can release gas, emitted within the casing 110, to outside even where the casing member 70 itself is somewhat deformed by expansion of the laminate-sheathed cell 11 in an abnormal situation. This leads to an efficacy that reliability in an abnormal situation can be improved.

Further, the split valve 120 serving as the gas release mechanism is split by utilizing expansion of the laminate-sheathed cell 11 in an abnormal situation. Further, the amount of deformation of the casing 110 which splits the split valve 120 can be maintained at a uniform level relatively easily. Thus, the split condition of the split valve 120 hardly varies.

Figure 11B:
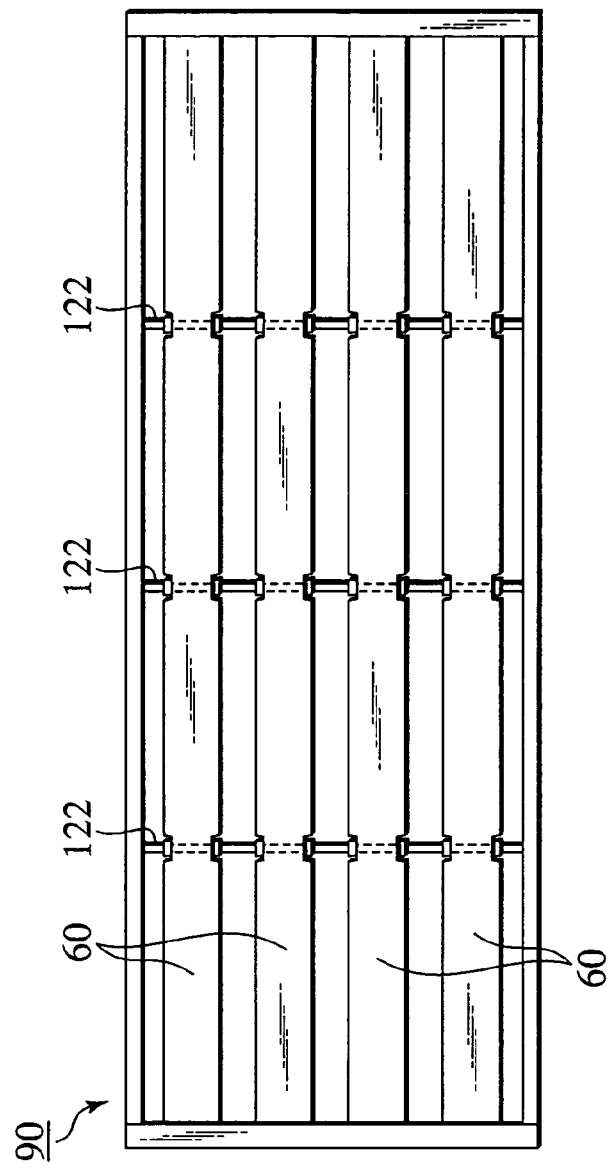
FIG. 11B is a side view showing the assembled battery constructed by stacking the battery modules which use the battery accommodation casings according to the fourth embodiment.
Figure 11A:
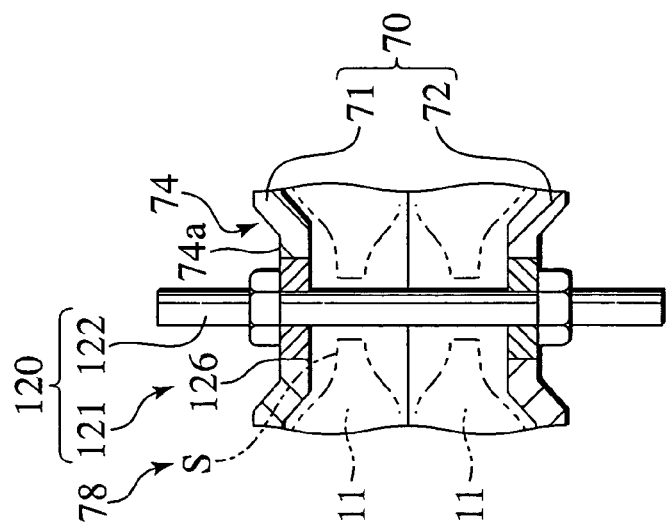
FIG. 11A is a cross-sectional view showing a substantial part of an assembled battery constructed by stacking battery modules which use the battery accommodation casings according to the fourth embodiment.

Moreover, where the assembled battery is configured by stacking the battery modules 60 as in the third embodiment (see FIG. 7), the fixing members 122 of the neighboring battery modules 60 are connected to each other in a vertical direction as shown in FIGS. 11A and 11B. In this manner, the fixing members 122 can substitute the connecting members 93 for the modules.

Note that FIGS. 11A and 11B show the case where the shaft members 127 are provided so as to connect the sealing plates 125 at the top and bottom in the drawings. However, the shaft members 127 may be configured to fix only the top or bottom sealing plate 125 in the drawing.

Moreover, illustrated was the case where each shaft member 127 penetrates the sealing plates 125. However, the fixing portion 122 is not limited to the shaft member 127 as long as it suppresses deformation of the fragile portion 121 while transmitting the force produced by expanded deformation of the casing member 70 to the fragile portion 121. Therefore, the fixing portions 122 may be provided near the sealing plates 125 without penetrating the sealing plates 125.

Figure 12A:
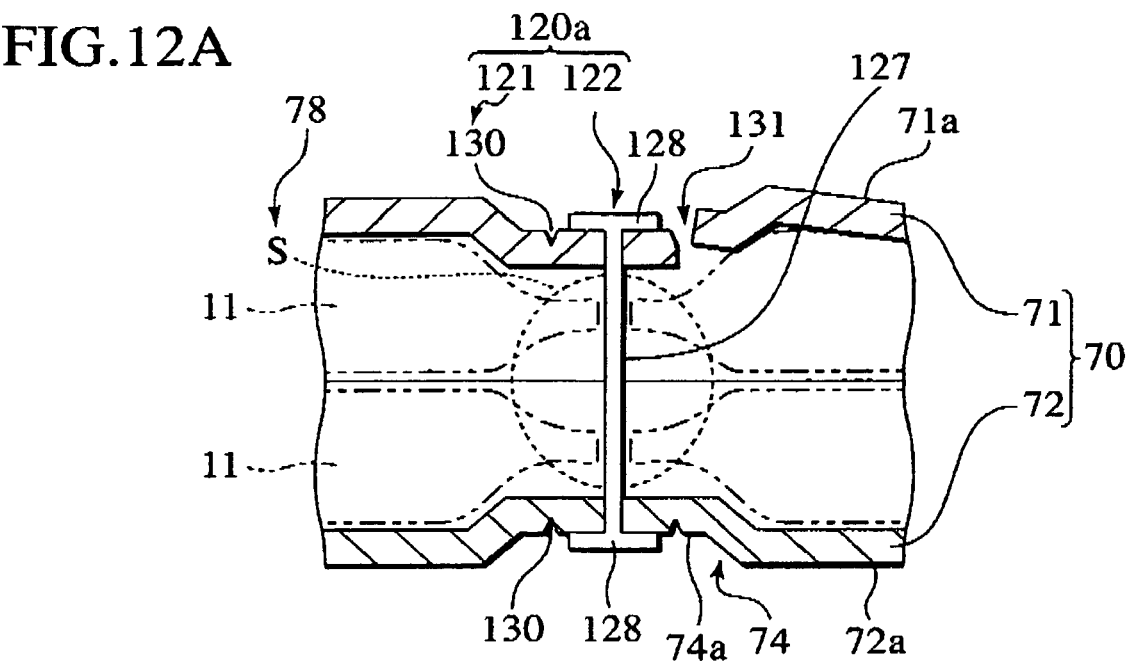
FIG. 12A is a cross-sectional view explaining a split valve of the battery accommodation casing according to the fourth embodiment.

FIG. 12A shows a split valve 120a which is the same type as the split valve 120 of the fourth embodiment.

Figure 12B:
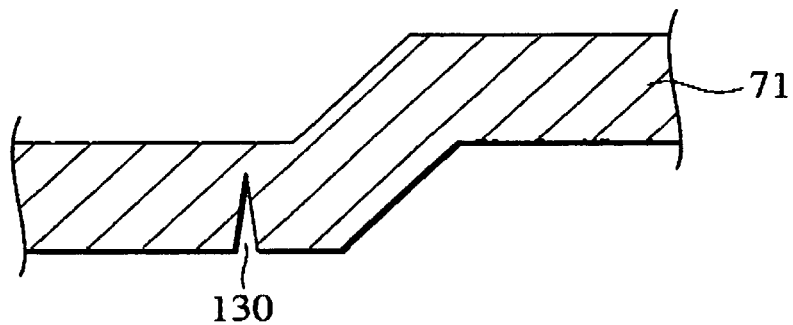
FIGS. 12B to 12D are cross-sectional views showing other examples of the split valve of the battery accommodation casing according to the fourth embodiment.
Figure 12C:
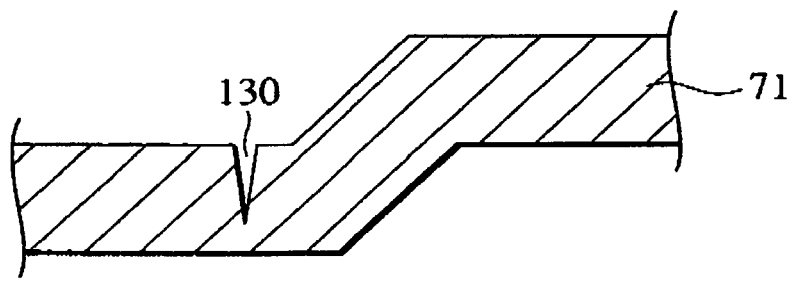
Figure 12D:
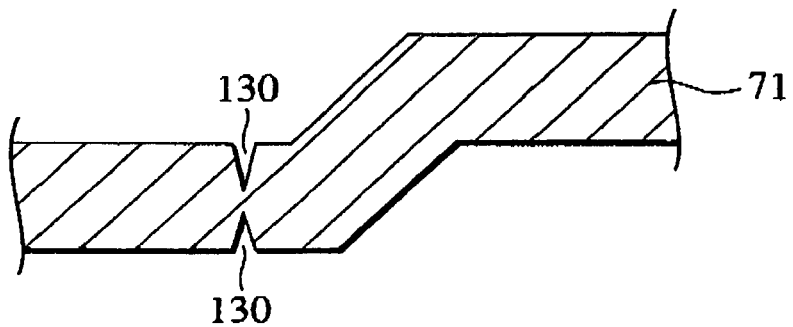

Each fragile portion 121 is not limited to the sealing plate 125 which is a member separate from the casing member 70. For example, as shown in FIG. 12A, each fragile portion 121 may also be configured by a thin portion 130 formed in a part of the wall of each recess 74 so that the fragile portion 121 is a part of the casing member 70. In this case, a gas release portion 131 is formed by deformation and thus breakage of the thin portion 130. The thin portion 130 is made as a groove in the casing member 70 so that the strength of the thin portion 130 is lowered. The thin portion 130 is formed around each fixing portion 122. However, similarly to the foregoing, each fixing portion 122 may be provided near the thin portion 130. In addition, as shown in FIGS. 12B to 12D, the thin portion(s) 130 may also be provided on the inner side of the casing member 70 (FIG. 12B), on the outer side of the same (FIG. 12C) or on both sides (FIG. 12D). Note that FIGS. 12B to 12D show the first casing member 71.

The split valve 120a with the above configuration leads an efficacy similar to that the aforementioned split valve 120 leads.

Other Modifications

In the battery module 60 explained in the first and fourth embodiments, the plurality of laminate-sheathed cells 11 are housed in the casing 61. However, it is of course possible that the battery module can be configured by housing one laminate-sheathed cell 11 in the casing.

The entire contents of Japanese Patent Applications No. P2003-338522 with a filing date of Sep. 29, 2003 and No. P2004-190356 with a filing date of Jun. 28, 2004 are herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A battery accommodation casing, comprising:
a casing member having a flat shape to house a laminate-sheathed cell therein in a sealing manner;
a recess having a hollow shape in cross section and formed on a surface of the casing member; and
a gas release mechanism located on a wall of the recess and releasing gas to outside, the gas being emitted from the laminate-sheathed cell within the casing member in an abnormal situation, wherein even if a surface of the casing member, on which the recess is formed, is in close contact with other part, at least one end of the recess communicates with a space around the battery accommodation casing so as to prevent the recess from being closed.

2. A battery accommodation casing according to claim 1, wherein the gas release mechanism is located in a bottom wall of the recess.

3. A battery accommodation casing according to claim 1, wherein the wall of the recess, where the gas release mechanism is located, is provided with a drain mechanism which allows no water to remain on the wall.

4. A battery accommodation casing according to claim 3, wherein the drain mechanism is configured by forming the wall of the recess into an inclined surface.

5. A battery accommodation casing according to claim 3, wherein the drain mechanism is configured by applying a water repellent agent onto the wall of the recess.

6. A battery accommodation casing according to claim 1, wherein the gas release mechanism has a gas release hole provided in the wall of the recess and a sealing plate which seals the gas release hole, and the gas release mechanism opens the gas release hole when an inner pressure of the casing member reaches a predetermined pressure.

7. A battery accommodation casing according to claim 6, wherein a surface of the sealing plate is formed flush with a surface of the wall of the recess, where the gas release hole is provided.

8. A battery accommodation casing according to claim 1, wherein the gas release mechanism has a fragile portion provided in the wall of the recess, and a fixing portion which suppresses deformation of the fragile portion while transmitting a force to the fragile portion, the force being produced by expanded deformation of the casing member due to expansion of the laminate-sheathed cell in an abnormal situation, and the gas release mechanism is configured to transmit the force to the fragile portion through the fixing portion, and then to cause the fragile portion to deform to form a gas release portion.

9. A battery accommodation casing according to claim 8, wherein the fragile portion is configured by a boundary surface between a gas release hole provided in the wall of the recess and a sealing plate sealing the gas release hole, and the gas release portion is formed by deformation and thus breakage of a wall around the gas release hole and/or the sealing plate.

10. A battery accommodation casing according to claim 8, wherein the fragile portion is configured by a thin portion whose thickness is thinner than that of the wall of the recess, and the gas release portion is formed by deformation and thus breakage of the thin portion.

11. A battery accommodation casing according to claim 8, wherein the casing member includes a first surface on a side where the fragile portion is provided and a second surface located on a side opposite to the first surface through a space where the laminate-sheathed cell is housed, and the fixing portion includes a member which fixes the fragile portion to the second surface.

12. A battery module, comprising:

a laminate-sheathed cell in which a power generating element is sealed by a flexible laminate film; and a battery accommodation casing which houses the laminate-sheathed cell therein, the battery accommodation casing, comprising:

a casing member having a flat shape to house a laminate-sheathed cell therein in a sealing manner;

a recess having a hollow shape incross section and formed on a surface of the casing member; and a gas release mechanism located on a wall of the recess and releasing gas to outside, the gas being emitted from the laminate-sheathed cell within the casing member in an abnormal situation.

13. An assembled battery, comprising:

a plurality of battery modules, each of the battery modules according to claim 12.

14. A vehicle, comprising:

a battery module according to claim 12.

* * * * *